United States Patent [15] 3,652,424
Jackson et al. [45] Mar. 28, 1972

[54] STABLE TOLYLENE DIISOCYANATE COMPOSITIONS

[72] Inventors: Roy Jackson; John Francis Wehner, both of Wilmington, Del.

[73] Assignee: E. I. du Pont de Nemours and Company, Wilmington, Del.

[22] Filed: Dec. 29, 1969

[21] Appl. No.: 888,925

[52] U.S. Cl. ............... 252/182, 260/77.5 AT, 260/77.5 NC, 260/239 A, 260/248 NS, 260/453 AR, 260/453 SP
[51] Int. Cl. ............... C07c 119/04, C07d 55/38, C08g 22/18
[58] Field of Search ............... 252/182; 260/453 AR, 453 SP, 260/248 NS, 239 A, 77.5 AT, 77.5 NC

[56] References Cited

UNITED STATES PATENTS

| | | | |
|---|---|---|---|
| 2,683,144 | 7/1954 | Balon et al. | 260/239 A |
| 2,978,449 | 4/1961 | France et al. | 260/77.5 NC |
| 3,452,073 | 6/1967 | Shultz | 260/239 A |
| 3,494,888 | 2/1970 | McElroy | 260/77.5 NC |
| 3,274,225 | 9/1966 | Saunders et al. | 260/453 A |
| 3,366,661 | 11/1968 | Anderson | 260/453 A |

Primary Examiner—Richard D. Lovering
Assistant Examiner—Irwin Gluck
Attorney—Raymond E. Blomstedt

[57] ABSTRACT

A process for preparing a tolylene diisocyanate (TDI) composition containing about 5–19 percent by weight nominal TDI trimer and having improved stability by heating a TDI composition containing about 25–40 percent nominal TDI trimer and an amount of TDI dimer such that the dimer/trimer ratio is greater than about 0.14 at a temperature of at least about 130° C. until the dimer/trimer ratio is less than about 0.14 and diluting the resulting composition with a monomeric TDI composition to achieve a nominal trimer concentration of about 5–19 percent.

12 Claims, No Drawings

STABLE TOLYLENE DIISOCYANATE COMPOSITIONS

BACKGROUND OF THE INVENTION

It is well known that isocyanate compositions of various types are useful in the preparation of numerous important commercial products, such as polyurethane coatings, elastomers and foams. It is also well known that isocyanate compositions containing tolylene diisocyanate, hereinafter referred to as TDI, trimers are particularly useful in that such compositions yield rigid and flexible polyurethane foams having improved physical properties and tough, highly insoluble polyurethane coatings having increased light stability. TDI compositions containing about 5–19 weight percent nominal trimer are particularly useful. The term "nominal trimer" refers to the percent trimer measured by the observed loss of NCO groups by the monomeric composition from which the trimer is prepared. Nominal trimer will hereinafter be referred to simply as trimer.

Many processes are known for trimerizing TDI. Unfortunately, however, many of the more effective processes for the production of TDI compositions containing about 5–19 percent by weight TDI trimer, such as those employing substituted guanidine and isobiguanide catalysts, produce compositions containing materials which result in undesirable, rapid, solids deposition. For example, in the preparation of TDI trimer, TDI dimer is also formed and when the concentration of dimer in a TDI composition is too high, dimer rapidly precipitates out of the liquid TDI composition as an undesirable solid which must be removed before the TDI composition can be used to manufacture acceptable polyurethanes.

There is, therefore, a need for a rapid, economical process for reducing the concentration of undesirable solids-depositing materials in TDI trimer compositions containing about 5–19 percent trimer and for preparing stable TDI trimer compositions which remain free from solids deposition for extended periods.

SUMMARY OF THE INVENTION

It has been discovered in accordance with this invention that TDI compositions containing about 5–19 percent by weight, preferably 10–18 percent, TDI trimer and an amount of TDI dimer such that the dimer/trimer ratio (determined by a spectrophotometric method described hereinafter) is less than about 0.14 exhibit improved stability and resistance to solids deposition. Attempts to prepare TDI trimer compositions containing about 5–19 percent trimer directly, i.e., by simply terminating trimerization at a trimer concentration in this range, is known to result in compositions containing undesirably high concentrations of solids-depositing materials which can be reduced only by heating for extended periods of time (e.g., 20–50 hours at 130°C.)

Now, in accordance with the present invention there is provided a process for preparing a TDI composition containing about 5–19 percent by weight TDI trimer and having improved stability by (a) heating a TDI composition containing about 25–40 percent TDI trimer and an amount of TDI dimer such that the dimer/trimer ratio is greater than about 0.14 at a temperature of at least about 130°C. until the dimer/trimer ratio is less than about 0.14 and (b) diluting the resulting composition with monomeric TDI compositions such as the crude reaction product (after solvent removal but prior to further treatment) of the phosgenation of tolylene diamine to achieve a trimer concentration of about 5–19 percent by weight. A particularly stable TDI trimer composition which remains free from undissolved solids for extended periods of time is prepared by adding about 2–10 parts of a polyol having an equivalent weight of about 30–1,000 and containing about three to eight hydroxy groups to 100 parts of diluted trimer composition.

DETAILED DESCRIPTION OF THE INVENTION

Trimerization is carried out in accordance with techniques well known in the art. A preferred method comprises trimerization in the presence of substituted guanidine or isobiguanide catalysts. From an economic standpoint, trimerization of crude TDI, i.e., the crude reaction product (after solvent removal but prior to further treatment) of the phosgenation of tolylene diamine, is preferred. However, the present invention is equally applicable to TDI trimer compositions prepared from refined TDI. Trimerization is allowed to proceed until the composition contains about 25–40 percent by weight trimer.

As used herein the phrase "percent by weight trimer" (i.e., nominal trimer) is the difference between the percent NCO content of the monomeric TDI starting material and the percent NCO content of the trimer-containing product at any given time, multiplied by 4.15 (the factor which correlates loss of NCO groups to the formation of trimer;

$$\frac{\text{Molecular weight of trimer}}{3 \times \text{equivalent weight of NCO}} = \frac{522}{126} = 4.15 \bigg).$$

The value thus obtained corresponds to the quantity of trimer in percent by weight which would be formed if the disappearance of three equivalents of NCO groups yielded one mole of trimer. Actually the observed loss of NCO groups results not only in the formation of simple TDI trimer (containing one isocyanaurate ring) but also from the formation of lesser amounts of TDI dimer and polymeric trimers (containing two or more isocyanurate rings). The percent NCO content is determined by reacting the TDI composition with an excess of dibutyl amine at 100°C. and titrating the resulting solution with hydrochloric acid. A detailed procedure for percent NCO determination is as follows:

1. Mix the sample thoroughly;
2. Add a carefully weighed amount (about 3.0 gm.) of sample to 50 ml. of dry toluene and stir until a complete solution has been obtained;
3. Add 25.0 ml. of 2N dibutylamine to the solution and stir;
4. Heat the solution to about 100°C. and cool to room temperature;
5. After cooling to room temperature, add 250 ml. of isopropyl alcohol to the sample;
6. Using a pH meter equipped with saturated calomel and glass reference electrodes, titrate the solution with 1N HCl to a pH of 4.2 to 4.5; and
7. Prepare a blank and run as above omitting the sample. In accordance with this procedure the percent NCO is defined as:

$$\frac{[\text{Ml. HCl used in (7)} - \text{ml. HCl used in (6)}] \times \text{normality HCl} \times 4.202}{\text{gms. of sample}}$$

Trimerization is allowed to proceed until about 25–40 percent by weight TDI trimer is formed in order to achieve a TDI trimer composition which is susceptible to rapid removal of solids-depositing materials. At trimer concentrations below about 25 percent, the process of removing solids-depositing materials becomes impractically slow and when the composition contains more than about 40 percent trimer, the viscosity of the composition becomes sufficiently viscous so as to make handling inconvenient.

The extent to which trimerization is allowed to proceed can be readily controlled by the addition of acids such as HCl and phosphoric acid or acid halides such as phosgene, benzoyl chloride, acetyl chloride and adipoyl chloride. Generally the addition of about one-half an equivalent of acid halide per equivalent of catalyst or the addition of about one equivalent of acid per equivalent of catalyst will effectively terminate trimerization.

The TDI trimer composition containing about 25–40 percent trimer is heated at a temperature of at least about 130°C. preferably at about 130°–137°C. Heating at 130°C. for a period of about 2–6 hours results in TDI trimer composition having reduced concentrations of undesirable solids-depositing materials. For example, a TDI composition made by conventional methods and containing 25–40 percent trimer normally contains an amount of undesirable TDI dimer such that the dimer/trimer ratio is about 0.4–0.5; after heat treatment this ratio is reduced to less than about 0.14.

The ratio of dimer/trimer for a given TDI trimer composition is determined by spectrophotometric methods and is defined as the maximum absorbancy of the composition at about 5.6 microns divided by its maximum absorbancy at about 5.8 microns. The infra-red absorbancy peak at about 5.6 microns is characteristic of TDI dimer and the peak at about 5.8 is characteristic of the trimer. A detailed procedure for determining the dimer/trimer ratio in accordance with the foregoing definition is as follows:

1. Weight 0.50 g. of sample into a sample vial and add 7.5 g. of reagent grade chloroform.
2. Shake the sample vial for a few seconds.
3. Using 0.2 mm. matched spectrophotometer cells, add the samples to one cell and place the cell in beam of a double beam infra-red spectrophotometer. Add chloroform to the reference cell and insert it in the reference beam of the spectrophotometer.
4. Set the absorbancy at 0.00 at 5.50 microns.
5. Scan from 5.50 to 6.2 microns.
6. Measure the absorbancy of the dimer peak at about 5.6 microns from zero absorbancy to the tip of the peak.
7. Measure the absorbancy of the trimer peak at about 5.8 microns from zero absorbancy to the tip of the peak.
8. Calculate dimer/trimer ratio by dividing the absorbancy at 5.6 microns (step 6) by the absorbancy at 5.8 microns (step 7).

The heat treated trimer composition is diluted with monomeric TDI to produce TDI compositions, having improved stability and resistance to solids deposition, which contain about 5–19 percent, preferably 10–18 percent, by weight TDI trimer. Preferably the dilution step is carried out after the TDI trimer composition has cooled to less than about 100°C. The TDI monomer diluent can be added to the trimer composition while said trimer composition is still at temperatures in excess of about 100°C. if the dilution is carried out concurrently with rapid cooling. Preferably cooling to temperatures below about 100°C. is accomplished within about 4 hours. In any event the TDI trimer compositions, before or after dilution, should not be exposed to temperatures in the range of about 80°–120°C. for longer than about 12 hours. Exposure of the trimer compositions to such elevated temperatures for extended periods of time will cause reformation of undesirable solids-depositing materials.

A particularly stable TDI composition containing TDI trimer which remains free from solids deposition for extended periods of time is prepared by adding about 2–10 parts of a polyol having an equivalent weight of about 30–1,000 and containing about three to eight hydroxy groups to 100 parts of diluted trimer composition. Preferably, about 4–7 parts of a polyol having an equivalent weight of about 100–200 is added to a TDI composition containing about 10–18 percent TDI trimer and having a dimer/trimer ratio of less than about 0.14. Suitable polyols include, for example, glycerol, trimethanol propane, 1,2,6-hexane triol, pentaerythritol, sorbitol, sucrose, hexol and oxypropylated derivatives of the above.

The following examples illustrate the invention. All parts, percentages and proportions are by weight unless otherwise indicated.

EXAMPLE 1

Toluene diamine (about 80 percent 2,4-isomer and 20 percent 2,6-isomer) is dissolved in o-dichlorobenzene and phosgenated substantially by the procedure disclosed in U.S. Pat. No. 2,822,373. Following the phosgenation, o-dichlorobenzene is removed by fractional distillation at reduced pressure at a bottoms temperature of 160°–170°C. The resulting undistilled toluene diisocyanate contains about 90 percent volatile toluene diisocyanate with the remainder being phosgenation by-products. The material has an —NCO content ranging from 42 to 44 percent by weight determined by the procedure described hereinbefore.

To 100 parts of undistilled toluene diisocyanate at 35°–40 °C. in an agitated vessel is added 0.1 part of tetramethylguanidine. The initial —NCO group content of the crude diisocyanate is 42.8 percent. Over a period of about 5 hours the temperature increases to 70°C. as a result of polymerization of the diisocyanate and cooling is applied to maintain the temperature below 80°C. After a total of 14 hours, the —NCO content drops to 34.9 percent and 0.06 part of benzoyl chloride is added to stop the polymerization. The decrease in —NCO content of 7.8 percent corresponds to a nominal trimer content of 32.4 percent. The dimer/trimer ratio (determined as described hereinbefore) is 0.42. The temperature of the charge is increased to 130°C. and maintained at 130°–132 °C. for 4 hours after which the dimer/trimer ratio is 0.11 and the —NCO content is 35.2 percent corresponding to a nominal trimer content of 31.5 percent. The charge is cooled to 60°C. over about 15 hours. About 75 parts of the undistilled toluene diisocyanate (—NCO content 42.3 percent) is added to the cooled material to yield a product having a —NCO content of 38.3 percent which corresponds to a trimer content of 17.9 percent. The diluted product has a dimer/trimer ratio of 0.10.

To 100 parts of the diluted product is added 5.5 parts of a hexol having an equivalent weight of about 125 (obtained by condensing 1,2-propylene oxide with sorbitol) and the mixture is heated to 80°C. for 2 hours to insure reaction of the hexol with diisocyanate. The addition of the hexol lowers the nominal trimer content to 17.0 percent (calculated from the nominal trimer content at the end of heating period, i.e., 17.9 × 100/105.5). The hexol modified product is stored in dry containers at 25°C. After 3 months storage, no solids are present in the product.

EXAMPLE 2

The following example is included for comparison and does not fall within the scope of the present invention.

Undistilled toluene diisocyanate is polymerized substantially by the procedure of Example 1 until the decrease in —NCO content corresponds to a nominal trimer content of 22.0 percent. The polymerization is stopped by the addition of benzoyl chloride. The dimer/trimer ratio at this point is 0.39. The material is heated to 130°C. and must be maintained at that temperature for 53 hours in order to lower the dimer/trimer ratio to 0.12. After heating, the material is cooled to 60°C. It has an —NCO content of 39.0 percent corresponding to a nominal trimer content of 18.1 percent.

During the heating step, samples are removed every hour and their dimer/trimer ratio is determined. The samples are then stored in dry containers at 25°C. With 1 week or less, samples having dimer/trimer ratios of 0.18 or greater contain a muddy layer of solids on the bottom of their containers. Samples having dimer/trimer ratios in the range of 0.12 to 0.15 do not deposit any such layer of solids even after storage for 2 months.

EXAMPLE 3

To 600 parts of undistilled toluene diisocyanate at room temperature in an agitated vessel is added about 0.4 part of tetramethylguanidine. The initial —NCO content of the diisocyanate is 43.13 percent. After about 20 hours, the —NCO content drops to about 41.8 percent and about 0.4 part of additional tetramethylguanidine is added. After about 6 hours the —NCO content is 38.6 percent and 0.86 part of benzoyl chloride is added. A second trimerization is carried out by the same procedure except that polymerization is allowed to proceed for about 8½ hours after the second addition of tetramethylguanidine before adding benzoyl chloride. After standing overnight the —NCO content of the first run (Sample 3A) is 37.24 percent corresponding to 24.3 percent trimer and the —NCO content of the second run (Sample 3B) is 36.72 percent corresponding to 26.5 percent trimer. Sample 3A is diluted with 210 parts of the initial crude diisocyanate to lower the calculated trimer content to 20 percent (Sample 3A'). Samples 3A' and 3B are both heated to 130°C. and maintained at that temperature. Periodically, portions are taken from the samples and analyzed for —NCO content and dimer/trimer ratio. The results are tabulated below.

| Time, hr. | % NCO | | Dimer/Trimer Ratio | |
|---|---|---|---|---|
| | 3A' | 3B | 3A' | 3B |
| 0* | 39.51 | 37.18 | 0.27 | 0.26 |
| 1.5 | 39.87 | 37.88 | 0.215 | 0.192 |
| 2.5 | 40.01 | 37.98 | 0.190 | 0.140 |
| 4.5 | 40.07 | 38.17 | 0.145 | 0.107 |

* Time at which temperature first reached 130°C.

Even though the difference in nominal trimer content between Sample 3B (26.5 percent trimer) and Sample 3A' (20.0 percent trimer) is relatively small, there is a significant increase in the rate at which the dimer/trimer ratio decreases in Sample 3B. Sample 3A' is outside the limits of the present invention and is included for comparison.

EXAMPLE 4

Two samples of undistilled toluene diisocyanate are polymerized and heat treated to yield products having nominal trimer contents of 15.7 and 18 percent by weight substantially in accordance with the procedure described in Example 2. The dimer/trimer ratio of each of the samples is below 0.14. To 100 parts of each of the samples is added 8.7 and 6.3 parts, respectively, of a hexol having an equivalent weight of about 125 (obtained by condensing 1,2-propylene oxide with sorbitol). After the hexol addition, the samples are heated to 80°C. for two hours to insure reaction of the hexol with the diisocyanate and then cooled to 25°C. The addition of the hexol lowers the nominal trimer contents of the samples to 14.5 and 17 percent by weight, respectively. Samples are stored at 25°C. for 4 months remain free from solids.

The foregoing examples clearly demonstrate that by the process of this invention TDI compositions containing about 5–19 percent by weight TDI trimer having reduced dimer content and exhibiting enhanced stability and resistance to solids deposition can be rapidly and conveniently prepared. Example 2 clearly demonstrates that preparation of such compositions by the processes of the prior art requires heating for excessively long periods of time.

We claim:

1. A process for the preparation of tolylene diisocyanate compositions containing about 5–19 percent by weight nominal tolylene diisocyanate trimer which consists essentially of (a) heating a tolylene diisocyanate composition containing about 25–40 percent nominal trimer and an amount of tolylene diisocyanate dimer such that the dimer/trimer ratio is greater than about 0.14 at a temperature of at least about 130° C. until the ratio of tolylene diisocyanate dimer to tolylene diisocyanate trimer present in the composition is less than about 0.14 and (b) diluting the resulting composition with monomeric tolylene diisocyanate to achieve a nominal trimer concentration of about 5–19 percent.

2. The process of claim 1 wherein the trimer composition is diluted with monomeric diisocyanate to achieve a nominal trimer concentration of about 10–18 percent.

3. The process of claim 1 wherein the temperature is about 130°–137° C.

4. The process of claim 1 wherein the monomeric tolylene diisocyanate is the practically solvent free, unrefined reaction of the phosgenation of tolylene diamine.

5. The process of claim 1 wherein the dilution is carried about at a temperature of less than about 100° C.

6. The process of claim 1 wherein the dilution is carried out concurrently with a rapid cooling step such that the temperature of the trimer composition is brought to below 100° C. within about 4 hours.

7. The process of claim 1 wherein there is incorporated into each 100 parts of the resulting composition about 2–10 parts of a polyol having an equivalent weight of about 30–1,000 and containing about three to eight hydroxy groups.

8. The process of claim 7 wherein 4–7 parts of polyol per 100 parts of trimer composition are employed and wherein the polyol has an equivalent weight of about 100–200.

9. The process of claim 7 wherein the polyol is a hexol having an equivalent weight of about 125.

10. A tolylene diisocyanate trimer composition, prepared by the process of claim 1.

11. A tolylene diisocyanate trimer composition, prepared by the process of claim 2.

12. A tolylene diisocyanate trimer composition prepared by the process of claim 7.

* * * * *